(12) United States Patent
Ehrlich et al.

(10) Patent No.: US 7,313,979 B2
(45) Date of Patent: *Jan. 1, 2008

(54) TRANSMISSION DEVICE FOR A MOTOR VEHICLE

(75) Inventors: Matthias Ehrlich, Buehl (DE); Norbert Esly, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 190 days.

This patent is subject to a terminal disclaimer.

(21) Appl. No.: 11/160,726

(22) Filed: Jul. 6, 2005

(65) Prior Publication Data

US 2006/0005648 A1    Jan. 12, 2006

(30) Foreign Application Priority Data

Jul. 8, 2004    (DE) .................. 10-2004-032989

(51) Int. Cl.
*F16H 59/00*    (2006.01)

(52) U.S. Cl. ................................... 74/335
(58) Field of Classification Search ............ 74/335, 74/473.36, 473.37
See application file for complete search history.

(56) References Cited

U.S. PATENT DOCUMENTS 1,749,837 A * 3/1930 Nickell, Jr. ................. 74/334
1,928,782 A * 10/1933 Church ....................... 74/359
7,093,511 B2 * 8/2006 Norum et al. ............... 74/335
2006/0005654 A1 * 1/2006 Ehrlich et al. ............ 74/473.1
2006/0096398 A1 * 5/2006 Stengel et al. .............. 74/335

FOREIGN PATENT DOCUMENTS

DE    199 53 292    5/2001
DE    102 06 561    10/2002

* cited by examiner

*Primary Examiner*—Dirk Wright
(74) *Attorney, Agent, or Firm*—Simpson & Simpson, PLLC

(57) ABSTRACT

The invention relates to a transmission device for a motor vehicle that has a plurality of gear sets that form gear ratio steps, final control mechanisms being provided and an actuation device being provided for the actuation of the final control mechanisms that has a plurality of drivable main control elements, especially shift fingers, to act on final control mechanisms for the engagement of gear ratio steps, it being possible to act on at least one final control mechanism via either a first or a second main control element, these two main control elements of the final control mechanism being moved as a function of the main control element that acts on this final control mechanism in one of two different directions, especially opposite directions, when in this context there is identical drive direction, especially identical rotational direction; and an actuation device and a method for the electronically controlled determination of reference positions of an actuation device.

15 Claims, 5 Drawing Sheets

TRANSMISSION DEVICE FOR A MOTOR VEHICLE

CROSS-REFERENCE TO RELATED APPLICATIONS

This application claims priority of German Patent Application No. 10 2004 032 989.3 filed Jul. 8, 2004, which application is incorporated herein by reference.

FIELD OF THE INVENTION

The invention relates to a transmission device for a motor vehicle, an actuation device for such a transmission device and a method for the electronically controlled determination of reference positions of an actuation device of a transmission device for a motor vehicle.

BACKGROUND OF THE INVENTION

For gear shifting operations in classically configured stepped motor vehicle transmission devices, the following three steps—starting from the old gear—are run through in timed sequence: "disengagement of the old gear"—"selection"—"engagement of the target gear". Moreover, motor vehicle transmission designs have become known in which the selection or select movement may occur before the disengagement of the old gear. In such configurations, it is provided, for example, that a main control element or shift finger is essentially responsible only for the engagement of gears, and additional geometries take on the function of disengaging gears. In this context, so-called secondary control elements in particular are used for the disengagement function. It may also be provided, for example, that the additional geometries are found on the one hand on central shift shafts and on the other hand on shift mouthpieces that are provided on final control mechanisms or shift forks or shift rails.

The disengagement geometries as a rule are operative in gates in which the shift finger is not active. In this context, it may be provided that a fixed assignment between shift finger and disengagement geometry in this context simultaneously represents an active gear lock. Structural implementations of this approach are therefore also referred to as "active interlock".

In such an "active interlock", it is generally provided that the main control element or the shift finger may be moved back into a central or neutral position without disengaging the gear. The select movement is therefore possible before the gear is disengaged.

Such a system, in particular an active interlock system, has become known through German Patent Application 102 06 561 A1. In that document it is further proposed that such a system be used for parallel shift transmissions. In the parallel shift transmission (PSG), different partial transmissions are disposed in different drive train branches. While the functionality of a transmission having only one drive train branch generally requires that only one gear at a time may be engaged in the transmission, in a parallel shift transmission, one gear may be engaged in each of the drive train branches at the same time.

German Patent Application 102 06 561 A1 proposes the provision of a common central shifting shaft for both partial transmissions. For the selection, this central shifting shaft is axially displaceable via electric motor, and for the engagement and disengagement of gears, this central shifting shaft is configured in a rotational manner. To produce the corresponding rotary and axial movements, exactly one electric motor is provided for each. On the shifting shaft, a plurality of secondary control elements are provided for the disengagement of gears as well as—first—a main control element, especially a shift finger, for the engagement of the gears.

In principle, gears could be engaged in both partial transmissions via this one shift finger. However, in order to reduce the axial displacement paths of these shifting shafts, German Patent Application 102 06 561 A1 proposes to provide a separate shift finger and separate secondary control elements for each of the partial transmissions, so that a total of two main control elements or shift fingers and a (correspondingly increased) number of secondary control elements are present there. Furthermore, German Patent Application 102 06 561 A1 proposes controlling the gear change operations or the actuation device via an electronic control device.

BRIEF SUMMARY OF THE INVENTION

It is known to the applicant that in such systems or in a known design of active interlock in conjunction with a rotary or central shifting shaft actuation, the gears are shifted using the turning shaft and starting from a neutral position having a rotational angle of approximately +/−60°. It may be necessary in such a design having electronic control to carry out a referencing procedure. This may, for example, be such that the electronic controller or the software for it determines all shift gates and the neutral gate of the transmission in such a referencing procedure. This occurs in particular in the case of a stationary vehicle, which assumes the "neutral" shifting state. Based on the referencing calculated in this way, the transmission actuator or the actuation device is blindly maneuvered within the gear shifting in order to carry out shifting operations. During operation, situations may result in which all referencing is suddenly lost. On the other hand, it is further known to the applicant that in this case a referencing procedure is carried out. As a rule, the decisive factor here is that specific features are provided by the hardware for the software. Such features are, e.g., the different height of the shift gates for both shift directions "+/−", which is explained below by way of example in relation to FIGS. 5a and 5b. In this way, it is possible to detect the direction or orientation of the shift direction in which the neutral gate is located. The difference in the height differential for systems known to the applicant is at least 1 mm above all tolerances in order for a difference to become detectable at all for the software. It is also known to the applicant that in this context these references may be realized inside the transmission actuator via the gate or a gate (mechanical illustration of the shifting scheme).

FIG. 5a shows, for example, such a design of a gate, which is known to the applicant, FIG. 5b showing a cutaway view along the line Vb-Vb from FIG. 5a. Central shifting shaft 100, which may also be called a turning or actuation shaft and which is a component of an actuator or an actuation device, can execute a movement in the axial direction, which is a select movement, that is schematically indicated by double arrow 102. Furthermore, it can—as diagrammatically indicated by arrows 104, 106—carry out a movement in the rotary or swiveling direction, which is a shift movement. A pin 108 is permanently attached to central shifting shaft 100. Plate 110 represents the actual gate. This plate 110 is permanently attached to the transmission housing and does not move. Provided inside this plate 110 are cutouts 112, 114, 116, which define a limit inside of which pin 108 may be moved. In this context it is provided that cutout 112 is higher than cutout 116. If, for example, pin 108 is positioned inside cutout 112 during a reference—"black out" of the software, the referencing procedure in this design would first initiate a movement of turning shaft 100 in the select direction, i.e., in the direction of double arrow 102, until each of the two limit stops is located. Using this process, the height of the cutout is determined and then compared to the values for the cutout height (large/small) stored in the software. Based on this information, the software control is able to decide that the turning shaft may be turned in a specific direction or by a specific rotational angle 104 in order to reliably reach cutout 114 or the neutral position.

The requirement present in this design, which is known to the applicant, on the software end that the height difference between the two cutouts 112, 116 must exceed a certain value (e.g., at least 1 mm) including all tolerances, limits the implementation in mechanical parts. The decisive factor here is the fixed relationship between the shift gate spacing, the pin diameter and the remaining land width between adjacent cutouts 112, 116. The primary problem is that in the implementation of the height difference of, for example, at least 1 mm between cutout 112 and 116—at least in the design known to the applicant—an unstable land is produced between adjacent cutouts 112. In the design known to the applicant, this web is thin enough (2 mm) that it cannot withstand long term loading due to contact in the direction of movement of the double arrow 102 or in the select direction.

The object of the present invention is to create a transmission device having an actuation device, or to create an actuation device, in which the neutral gate or a neutral reference of the actuation device or of a transmission actuator can be located in a simple and operationally reliable way. It would furthermore be desirable if a design of this type—at least in a further development—is formed in such a manner that it has a controller, especially an electronic controller, it being possible for the neutral gate or the neutral reference to be located again as well as possible or, at least in any case, by the controller in the event of a reference "black out", without carrying out shifts in the transmission.

According to the invention, a transmission device as described in claim 1, claim 2 or claim 5 is proposed. An actuation device according to the invention is the subject matter of claim 14. A method according to the invention is the subject matter of claim 15. Preferred embodiments are the subject matter of the dependent claims.

According to the invention, in particular a transmission device for a motor vehicle is proposed that has a plurality of final control mechanisms and an actuation device or a transmission actuator for actuating these final control mechanisms. For the engagement of gear ratio steps, the actuation device has, for acting on the final control mechanisms, a plurality of drivable main control elements of which at least one is a first main control element and one is a second main control element. It is provided that via the first main control element or the second main control element at least one final control mechanism may be acted on and in particular in order to engage a gear ratio step or one of the gear ratio steps assigned to this final control mechanism. In particular it may be provided that, it is possible to act on any one of a plurality of final control mechanisms or all of them via any one of these main control elements. When the drive direction, especially the direction of rotation, for this first and second main control element is identical—especially in the comparison—the direction of rotation of the final control mechanism, upon which either one of these two main control elements may act, and in particular in order to engage a gear ratio step, is a function of which of these two main control elements acts on the final control mechanism in question. Therefore, it is provided in particular that the relevant final control mechanism is moved in a first direction if the first main control element acts upon it so as to actuate it and in a second direction, especially the direction opposite the first, if instead the second main control element acts on it, the first and second main control elements in both of these cases being driven in the same direction. It may also be provided that each non-active main control element is moved together with the active main control element.

It is provided in particular that the first and second main control elements may each be moved or driven in different directions, especially opposite directions, the one direction—the same for the two main control elements—being specified for the engagement of a gear ratio step and the other being specified for the return movement of the main control element, and in particular for the return movement in the direction of a neutral position, without the final control mechanism, by means of which a gear ratio step was previously engaged, thereby or as a result being moved.

Furthermore, according to the invention, a transmission device is proposed, especially for a motor vehicle, in which an actuation device has one or more—preferably two—drivable main control elements for acting on final control mechanisms for the engagement of gear ratio steps. Preferably, one of these main control elements is a first main control element and one is a second. It is provided in particular that main control element neutral positions are assigned to each of the main control elements. These main control element neutral positions are in particular such as to form a neutral gate for the main control element in question. In these main control element neutral positions, the particular main control element for selecting a final control mechanism that is to be acted upon in order to engage a gear ratio step may be moved, and in particular independently of the positions of the final control mechanisms. It is provided—especially in this design—that at least one limit stop device is provided for the main control element that is positioned in such a way that a main control element stopping against this limit stop device is positioned in a main control element neutral position, a final control mechanism being selectable via a movement of the main control element along this limit stop, and in particular a final control mechanism that is to be acted on via the main control element for the engagement of a gear ratio step. This effect may in particular occur in such a way that this main control element is moved, for example, in a direction transverse to a neutral gate of the main control element and—especially after covering a certain free travel—acts to apply a load to the corresponding final control mechanism.

Furthermore, according to the invention a transmission device for a motor vehicle is proposed in which final control mechanisms are provided, each of which has a connecting element such as a shift rail or shift fork. An actuating device or a transmission actuator is also provided that has an actuation or central shifting shaft. This actuation shaft is mounted in an axially displaceable and rotational or swiveling manner. The actuation device also has two main control elements for the actuation of the final control mechanisms or the connecting elements of the final control mechanisms. By means of these main control elements, it is possible to act on the final control mechanisms in such a manner that a particular gear ratio step is engaged. The main control elements may be configured, for example, as shift fingers. It is also provided that the actuating device has one or more secondary control elements. By means of these secondary control elements, it is possible to act on final control mechanisms in such a manner that a particular engaged gear ratio step is disengaged, and/or gear ratio steps are locked. These two main control elements, that is, the first main control element and the second main control element, are disposed offset from each other when viewed in the circumferential direction of the actuation shaft. It is also provided in particular in this design that these two main control elements, assigned in particular to each other, extend from this actuation shaft in planes that are set apart and oriented transverse to the axial direction of the actuation shaft or operate in planes of this type. It is also provided that either one of these two main control elements may act on a final control mechanism or a selected final control mechanism in such a manner that a prescribed gear ratio step is engaged. In this context it may be provided that the main control element in question is selected in such a manner that the actuation shaft is moved into a corresponding axial position at which this main control element in a subsequent rotation or swiveling—especially after covering a free travel—may accordingly load the final control element in question. It is also provided in this design that in each rotational direction of the actuation shaft, when the one main control element acts on the final control mechanism in question, the connecting element of this final control mechanism is moved in a first direction and, when the other main control element acts on this final control mechanism, its connecting element is moved in a second direction, which is opposite the first.

However, this action of these two main control elements on the final control mechanism, which is the same for each, is done in particular as desired. Thus, it may be provided in particular that if the connecting element is to be moved in the one direction for the engagement of a corresponding gear ratio step, the one main control element of these two is selected and then acts on this actuation mechanism, and if the desired direction of movement of the connecting element is in the opposite direction, the other main control element for acting on this final control mechanism is selected so that, by means of this other main control element, the other gear ratio step that is assigned to this final control mechanism may be engaged. In this context it is provided therefore that in both of these cases, each of the drive or rotational directions of the actuation shaft is the same. Therefore, it is provided in particular that the shift direction change for the engagement of gear ratio steps is achieved by switching of the particular main control element so that a specific shift direction of the final control mechanisms is assigned to each main control element, these main control elements nevertheless being driven in the same direction.

The transmission device of the present invention has in particular a plurality of gear sets that form gear ratio steps or gears. It is provided in particular that to each of the final control mechanisms is assigned at least one gear ratio step that may be engaged or disengaged via the particular final control mechanism to which this (these) gear ratio step(s) is (are) assigned. Preferably, it is provided that each of the gear ratio steps is assigned to exactly one of the final control mechanisms, while a plurality of gear ratio steps, especially two, is assigned to at least one final control mechanism. It is provided in particular that it is possible to act on at least one of the final control mechanisms and preferably on a plurality thereof, and especially preferably on all of them via either the first or the second main control element. In a preferable design, the final control mechanisms each have a connecting element, such as a shift fork or shift rail. For the sake of simplification, shift rails are also spoken of instead of connecting elements, a shift rail being only one exemplary configuration. Instead, a shift fork or an element formed differently, for example, may also be provided. Preferably, the shift rails of different final control mechanisms are aligned parallel to each other and especially preferably at a distance from each other. In an especially preferable design, the shift rails are mounted in an axially displaceable manner.

In a preferred design, the final control mechanisms, and in particular the shift rails of the final control mechanisms, each have at least one shift mouthpiece that is disposed, for example, in or on such a shift rail. Such a shift mouthpiece may be configured as closed in an advantageous design. This shift mouthpiece is used for the engagement of a main and/or secondary control element. It may be provided that exactly one shift mouthpiece is disposed on each final control mechanism for the engagement of main and secondary actuation control elements. However, a plurality of shift mouthpieces may be disposed on each final control mechanism. For example, separate shift mouthpieces may be provided for the engagement of main control elements on the one hand and for the engagement of secondary control elements on the other. It is provided in an especially preferred design that each of the shift mouthpieces has a functional edge and/or functional surface, especially a separate one, for each main control element and each secondary control element that may be engaged with this shift mouthpiece. Functional surfaces or functional counter-surfaces may be provided on the main or secondary control elements in question. In this context, it is provided in particular that in the cooperation of main and secondary control elements and shift mouthpiece, there is an engagement via the functional edges or functional surfaces.

It may be provided that the gear ratio steps or gear sets each have a gear—especially an idler gear—that is rotatably mounted in relation to a shaft that carries it and may be connected to this shaft in a rotationally fixed manner to engage the gear ratio step in question. For this purpose, it may be provided, for example, that the final control mechanism in question has a final control part, such as coupling sleeve—displaceable, for example—by means of which such a connection may be produced and released. The system having the gear ratio steps and the final control mechanisms may also be characterized as a transmission (in the strict sense) and in this way are distinguished from the actuation device.

The main control elements are preferably shift fingers. The secondary control elements may, for example, be cams or double cams.

It is provided in particular that two gear ratio steps that are assigned to at least one final control mechanism are engageable via this mechanism. It may be provided that two such gear ratio steps are assigned to each of the final control mechanisms. It may also be provided that only one gear ratio step is assigned to a portion of the final control mechanisms. This may be the case, for example, in transmissions or partial transmissions that have an uneven number of gear ratio steps or gears. The final control mechanisms are disposed in particular in a moveable, preferably axially movable manner.

It is provided in particular that final control mechanisms to which two gear ratio steps are assigned may be moved into two different gear positions in which the gear or gear ratio step in question is engaged. In this context a reference point on a connecting element or a shift mouthpiece, for example, may determine or define the particular position. In such final control mechanisms to which two gear ratio steps are assigned, these gear positions are disposed in particular so that between these two gear steps a neutral position of the final control mechanism or connecting element in question is provided so that in particular this neutral position must be overrun in order for there to be a shift from one of the two gear ratio steps into the other gear ratio step that is assigned to the same final control mechanism.

In an especially preferable design, the final control mechanisms each have a connecting element and a final control element, especially a coupling sleeve, or are formed by them.

It is provided in particular that they may be moved in such a manner that they act to apply a load on a final control mechanism and that, nevertheless, they also may be moved in such a manner that when they move they do not act on a final control mechanism. In particular this is so that a final control mechanism for engaging a gear ratio step may be loaded via one of the main control elements, it being possible for this main control element to then move into its neutral position or neutral gate and then move within or along this neutral gate without the previously engaged gear or gear ratio step being disengaged again in the process. It is provided in particular that a gear engaged in this manner is disengaged via a secondary control element if it or another main control element is then moved in the shifting direction in an offset plane or in a prescribed manner within a shift gate that is assigned to another final control mechanism. In this context it is provided that during this movement within another shift gate, first a "free travel" is covered on which the main control element in question at first does not yet act on this other final control mechanism, though—in particular via corresponding coupling with one or more secondary control elements—these secondary control elements are caused to operate in all other shift gates of the same transmission or partial transmission, that is, in the shift gates that are not assigned to the target gear. Therefore, it is provided in particular that these secondary control elements act on the final control mechanisms of the other shift gate and these final control mechanisms—provided that they are not in a neutral position—move into this neutral position. Furthermore, it is especially preferably provided that these secondary control elements act on the corresponding other final control mechanisms in such a way that the mobility of these other final control mechanisms is blocked so that the gear ratio steps or gears that are assigned thereto are locked. Such a locking may ensure, for example, that undesired influences, such as vibrations or the like, do not unintentionally move the final control mechanisms not assigned to the target gear into a gear position.

Especially preferably, it is provided that—if it is ensured that in all other shift gates there are no final control mechanisms in a gear position, or it is ensured that these final control mechanisms are in a neutral position, or it is ensured that the gears assigned to them are disengaged—the relevant (active) main control element acts on the final control mechanism in such a way that upon continued movement the target gear or the target gear ratio step is engaged. In the designs including an actuation shaft, it is provided in particular that a first rotational angle range is provided within which the active main control element is moved corresponding to an "idle stroke", whereby simultaneously gears in other shift gates are disengaged or it is ensured that they are disengaged and whereby, in a subsequent rotational angle range of the actuation shaft, the main control element acts on the final control mechanism in question in such a manner that the target gear is engaged. It should be noted that, if an old gear and a target gear are assigned to the same final control mechanism, preferably the old gear is disengaged via a main control element that acts in the corresponding gate. Apart from this case, it is preferably provided that the main control elements do not effect the disengagement of gears or gear ratio steps.

It is provided in particular that the main control elements and the secondary control elements always ensure that, in the transmission or, insofar as a plurality of partial transmissions is provided, only one gear or gear ratio step may—simultaneously—be engaged in each of these partial transmissions.

For the cooperation of main control elements with the final control element, it may be provided, for example, that the—especially both—main control elements and the final control mechanisms have correspondingly designed and positioned engagement areas or functional surfaces. For example, it may be provided that the two main control elements in question are mounted so that they are axially offset on an actuation shaft or central shifting shaft and turned in the circumferential direction, for example 180°, and are configured like a finger. Especially in combination with this, it may be provided that in the final control mechanisms a shift mouthpiece, especially a closed one, is provided in which one of these two main actuation elements may engage to apply a load in order to move the final control mechanism in question in one of its two directions of movement. In so doing it may be provided, for example, that the two main control elements are mounted on the actuation shaft in an offset manner in the axial direction thereof. This may, for example, be such that they are disposed directly adjacent at a greater distance from each other.

It is provided in a preferred embodiment that the main control elements in their neutral position or at a position corresponding to a neutral gate position extend essentially transversely, preferably perpendicular to the direction of movement of the final control mechanisms or the connecting elements.

In a preferred embodiment, it is provided that the actuation device has an actuation shaft and the first main control element and the second main control element operate on or in different planes and are disposed at an angle, especially a 180° angle with respect to each other. However, such an angle may also be other than 180°. It may be provided, for example, that the two main control elements are disposed in relation to each other in axially offset and, in the rotational direction, swiveled manner. They may, for example, be offset directly adjacent to each other in the axial direction. However, intermediate spaces may also be formed. Preferably, the main control elements, and especially the first and second main control elements, are radially offset in relation to the longitudinal axis of an actuation shaft, and in particular preferably offset 180° with respect to each other in the circumferential direction.

It is also preferable for the actuation device to have at least one secondary control element to act on final control mechanisms to produce movements for the disengagement of gears and/or for the locking of gears. These secondary control elements and the final control mechanisms, especially shift rails, may have correspondingly formed functional surfaces especially for this purpose that may also be harmonized with the functional surfaces for the cooperation of main control elements and final control elements in order to ensure that all other gears are disengaged before the engagement of a gear in the same transmission or partial transmission.

The final control mechanisms may have, for example, a connecting element, such as a shift rail or shift fork. It may be provided, for example, that a main control element engages in such a connecting element if it loads or moves the final control mechanism in question.

In a preferred design, idle gates are provided between the shift rails, which are preferably aligned parallel to each other and spaced apart. In this context, it is especially preferably provided that one of the two main control elements, which is inactive at the time, is disposed in the area of the plane of such an idle gate or swivels into such an idle gate if the assigned other main control element is active.

In a preferred design, the transmission device has two or more partial transmissions. Especially preferably, it is provided that separate main and/or secondary control elements are provided for each of these partial transmissions. In this context, it may be provided that these main or secondary control elements that are assigned to different partial transmissions are disposed on exactly one actuation shaft. However—in the case of a plurality of partial transmissions—common main or secondary control elements are provided for a plurality of partial transmissions or all of them. The transmission may in particular be a twin clutch transmission (DKG) or a parallel shift transmission (PSG). It may also be provided that the transmission device has only one partial transmission. The transmission device may be designed, for example, as an automated shift transmission (ASG). The transmission device may also be designed as a manual shift transmission.

In a preferred design, an electronic controller for driving the actuation device is provided, it being worth noting that this does not apply to the case in which the transmission device is designed as a manual shift transmission. It may also be provided that this electronic controller drives electric motors, which in turn drive movements of the actuation device or, as components of the actuation device, produce a load there on the input side. It may be provided that an electric motor is provided for the selection movement and an electric motor is provided for the shift movement. In particular, it may be provided in the design having a rotating or swiveling and axially moveable actuation shaft that an electric motor effects the movement in the axial direction and another electric motor effects the movement in the rotary direction. In designs having a plurality of partial transmissions, it may be provided that a separate electric motor is provided for each partial transmission or a common electric motor is provided for both partial transmissions. Preferably, at least one incremental sensor is provided that detects the position change of the actuation device and/or the transmission. In particular, it may be provided that separate incremental sensors are provided for the select direction and the shift direction.

It is also preferable that the actuation device has exactly two main control elements for the engagement of all gear ratio steps of the same partial transmission or—if it has only one partial transmission—of the same transmission. It may also be provided that exactly two main control elements are provided for a plurality of partial transmissions or all of them, it being possible by means thereof to act on all final control mechanisms of both partial transmissions.

However, more than two main control elements may be provided for each partial transmission. However, it is provided in particular that these may be divided or classified into first and second main control elements.

The limit stop device may—but does not have to—be a limit stop device that directly contacts the main control element. However, it may also be provided that such a limit stop device is provided, for example, on a drive device, like an electric motor. Such a limit stop may in particular be a mechanical limit stop. However, limit stops formed differently are also possible. Moreover, it may be provided that such a limit stop device acts on an actuation shaft. Furthermore, it may be provided that a gate is provided through which, for example, a pin is guided that ends up in a limit stop position. Such a gate may also be designed, for example, as a sleeve that extends around an actuation shaft and is fixedly mounted, for example, on a transmission housing.

The transmission device has in particular one active interlock.

According to the invention, an actuation device for the actuation of final control mechanisms is proposed according to claim 14. This actuation device has at least one main control element and at least one secondary control element. In this context, it is provided in particular that the actuation device has at least two main control elements of which one is a first main control element in the sense of the present application and the other is a second main control element in the sense of the present application. This actuation device may in particular be designed as it is explained in relation to the actuation device of the transmission device of the present invention.

Furthermore, according to the invention, a method as described in claim 15 is proposed.

It is provided in particular that the drive device for determining the neutral position, neutral gate or a reference position within this neutral gate is always driven using the same drive direction. Therefore, it may also be provided that a signal of a control device on an electric motor, which can drive a main control element in the shift direction, is sent in order to drive this electric motor in a prescribed rotational direction.

The reaching of such a limit stop position may, for example, be determined via an evaluation of the power supply of the electric motor. A jump in the supply of power, for example, may indicate that a limit stop has been reached. However, it may also be provided that the reaching of a limit stop may be concluded based on the stoppage of the incremental sensor. It may also be provided that the electric motor is supplied with electricity over a time span that is certainly sufficient to reach this limit stop position. Other possibilities are also possible.

BRIEF DESCRIPTION OF THE DRAWINGS

Exemplary embodiments of the invention are explained below in reference to the figures, but the invention is not limited by them. In the drawings:

FIG. 5b shows a cutaway view along the line Vb-Vb from FIG. 5a; and,

DETAILED DESCRIPTION OF THE INVENTION

Figure 1:
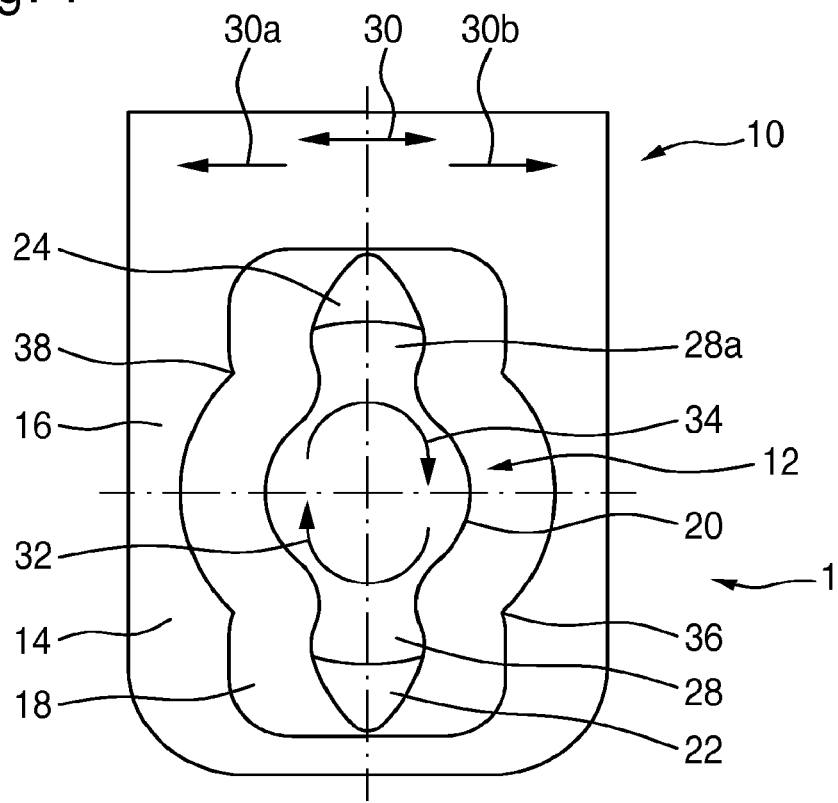
FIG. 1 shows a partial view of a transmission device according to the invention.

FIG. 1 shows a partial view of an exemplary transmission device 1 according to the invention having a plurality of final control mechanisms—also shown in part—and an actuation device 12—shown in part—for actuating these final control mechanisms 10. The transmission device 1 also has a plurality of gear sets (not shown) that form gear ratio steps.

Concerning the final control mechanisms 10, a shift rail 14 or a projection 16 of a shift rail 14 is shown in which a shift mouthpiece 18 is provided. This projection 16 is disposed in particular on the remaining part of the shift rail 14 in such a manner that the shift rail—in FIG. 1—continues at the top end of projection 16, which is shown there, and in particular with a main extension direction that in FIG. 1 is the horizontal direction.

The shift rail 14 may in particular be coupled with a final control element such as coupling sleeve 15. Coupling sleeve 15 may be configured, for example, as a sliding sleeve and may be used to shift a gear that is rotatable in relation to a shaft in a rotationally fixed manner in order to thus effect the engagement of a gear or the gear ratio step. The gear wheels of the transmission device by means of which gear ratio steps are formed are in particular toothed gear wheels.

The actuation device 12 has a first main control element 22 and a second main control element 24. Furthermore, actuation device 12 has secondary control elements 26, 26a, 28, 28a. These main and secondary control elements are disposed on the actuation shaft. This may also be inferred, for example, from FIG. 2, which shows actuation shaft 20 in partial view with main control elements 22, 24 and secondary control elements 26, 26a, 28, 28a in three-dimensional perspective.

Figure 2:
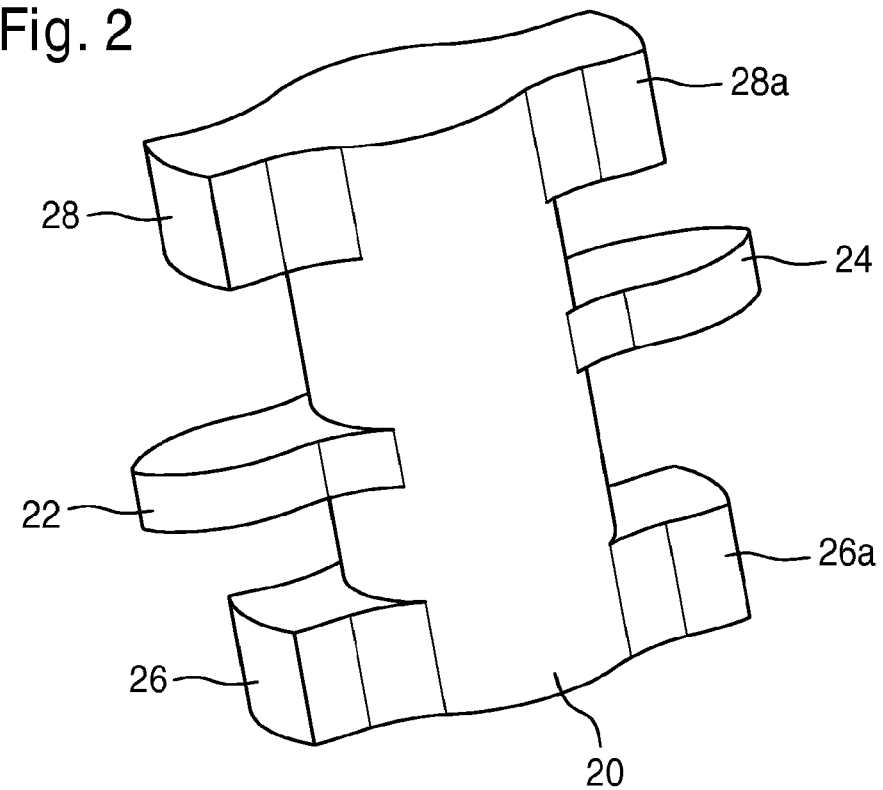
FIG. 2 shows a partial view of an actuation shaft according to FIG. 1 having two main control elements and secondary control elements.

In FIG. 1, the projection of the main control elements 22, 24 and the secondary control elements 26, 26a onto or into a shift rail plane is shown. It is especially important—especially for this exemplary embodiment—that two main control elements 22, 24 are provided that nevertheless operate—as is evident from FIG. 2—on or in different planes and are disposed in relation to each other at an angle clearly deviating from 0°. This is shown in FIGS. 1 and 2 in such a manner that the two main control elements 22, 24 are each disposed at an angle of 180°. A 180° angle between these two main control elements 22, 24 is especially advantageous in the cooperation with the geometry of shift mouthpiece 16 as shown in FIG. 1. This geometry is in particular such that the shift mouthpiece is limited in the direction of movement 30 of shift rail 14 in both orientations by a sector, the transition area of these two sectors being formed by approximately rectangular areas. The direction of extension of the shift mouthpiece in direction of movement 30 is thus larger than in the direction perpendicular thereto.

Via the main control elements 22, 24, it is possible to act on the shift rails in such a manner that they are axially moved. This axial direction of movement is schematically indicated in FIG. 1 by double arrow 30. In order to effect such an axial displacement of shift rail 14, actuation shaft 20 is positioned in such a manner that a main control element 22 or 24 is positioned in the area of or inside of a shift mouthpiece. Next—and in particular starting from a neutral position of main control element shown 22 or 24 in FIG. 1—the actuation shaft 20 is turned so that the main control element 22 or 24 in question comes into contact with the selected shift rail in question after going past an idle stroke and then loads it upon continued movement so that this shift rail 14 is also moved. Depending on which of the two main control elements 22, 24 is positioned in this way inside the shift mouthpiece or cutout 18 or acts on shift rail 14 to actuate it, the shift rail thus is moved in the one 30a or the other 30b of its two opposing directions of movement 30a, 30b.

However, in both of these cases it is provided that actuation shaft 20 is driven in the same drive direction or the same rotational direction if shift rail 14 is to be moved via a main control element 22, 24 in such a manner that a gear ratio step is engaged. This direction of movement or rotational direction is diagrammatically illustrated by arrow 32. However, the actuation shaft 20 is rotationally mounted is such a way that it may also be moved in the opposite direction or opposite rotational direction, which is diagrammatically indicated by arrow 34. However, it may be provided that this rotational direction 34 is blocked by a limit stop or the like if the main control elements 22, 24 are in the neutral position shown in FIG. 1. In direction of movement 34, actuation shaft 20 may therefore be moved if it has been moved beforehand out of its neutral position corresponding to direction of rotation 32 or disengaged. If actuation shaft 20 is moved corresponding to rotational direction 34, none of the main control elements 22, 24 loads one of the shift rails 14. These main control elements 22, 24 may therefore be moved without a final control mechanism 10 or a shift rail 14 being moved in the process.

Secondary control elements 26, 26a, 28, 28a, which—like main control elements 22, 24—are fixedly mounted on actuation shaft 20, are used so that, if actuation shaft 20 is turned or swiveled in rotational direction 32, these secondary control elements ensure that a gear of the same partial transmission that might be engaged is disengaged and then locked or all gear ratio steps of the same partial transmission are locked. In this locking operation, one or more secondary control elements block the shift rails of the same partial transmission in which a main control element is positioned to act on the corresponding shift rail after an idle stroke.

In FIG. 2, it is evident that main control elements 22, 24 are disposed axially offset from each other. The secondary control elements are in turn disposed axially offset from them.

Figure 3A:
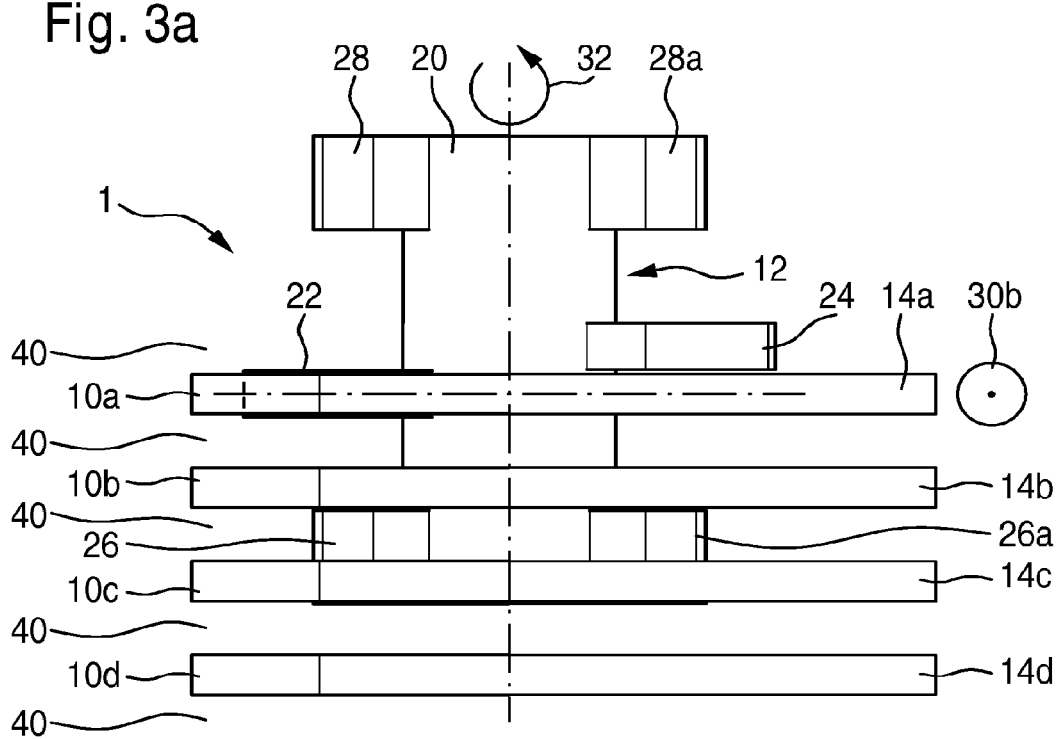
FIGS. 3a and 3b show a partial view of a transmission device according to the invention, two different positions of the actuation device being shown and where it is possible to combine this design, for example, with the design according to FIG. 1 and/or 2.
Figure 3B:
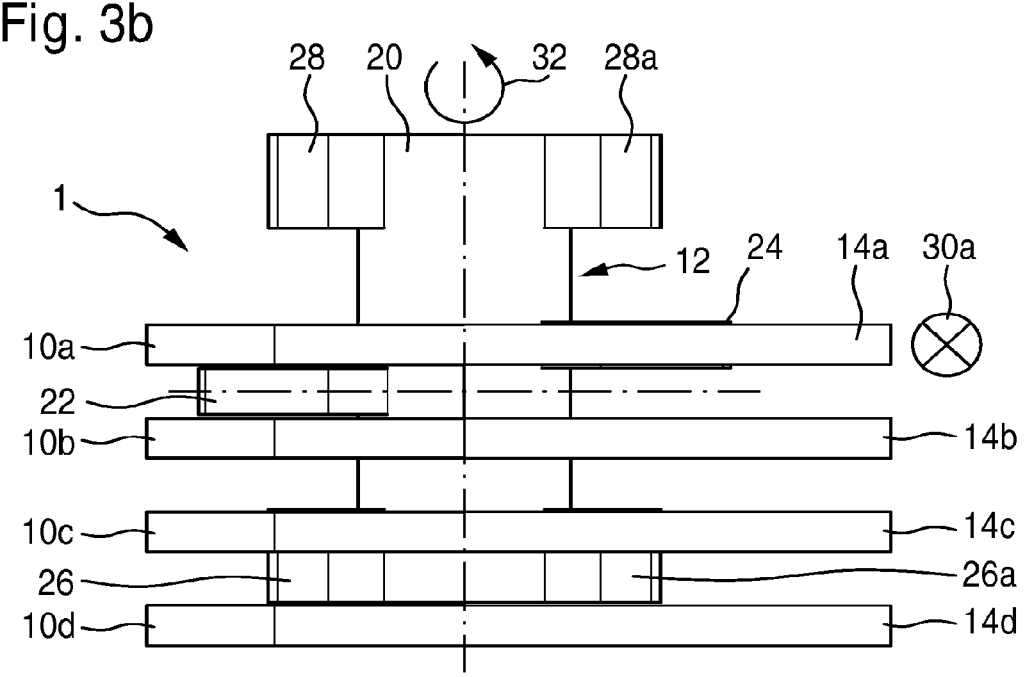

As is very evident in FIG. 1, shift mouthpieces 18 or shift rails 14 are designed in a closed manner. Shift mouthpieces 18 have a functional edge 36, 38 for each main control element 22, 24 and each secondary control element 26 or 26a or 28 or 28a. Idle gates are provided between shift rails 14—when viewed in the axial direction of control shaft 20 or in the select direction—which is very evident in FIGS. 3a and 3b. Furthermore, it is recognizable there that the shift rails are disposed parallel and adjacent to each other. For better distinguishability, the different shift rails 14 in FIGS. 3a and 3b are provided with reference characters 14a, 14b, 14c and 14d. The various final control mechanisms 10 are accordingly designated with reference characters 10a, 10b, 10c and 10d. The reference characters in FIGS. 3a and 3b essentially correspond in other respects to those that were also used in FIGS. 1 and 2.

It is also very evident in FIGS. 3a and 3b that always only one main control element 22 or 24 is engaged with a shift rail 14 or is positioned within it in such a way that by subsequent rotation it is able to act on the corresponding shift rail to load it, while the other main control element is swiveled into an idle gate 40 between the (corresponding) shift rails or is disposed in the area of such an idle gate 40.

At the (axial) position of actuation shaft 20 according to FIG. 3a, it is such that second main control element 24 is disposed in the area of such an idle gate 40 and first main control element 22 is engaged with shift rail 14a or is disposed in shift mouthpiece 18 of shift rail 14a. At the (axial) position of control shaft 20 according to FIG. 3b, which is moved downward compared to FIG. 3a, it is such that the first main control element 22 is disposed in the area of an empty gate 40, while second main control element 24 is disposed within shift mouthpiece 18. While—starting from the position shown in FIG. 3a at which main control element 22 is still in its neutral position—shift rail 14a may be moved in the direction of arrow 30b (after covering an idle stroke), this shift rail 14a, in the position corresponding to FIG. 3b, may be moved accordingly in the opposite direction, that is, in the direction of arrow 30a.

In both of these cases, the rotational direction is identical in each case to the movement or rotational direction of actuation shaft 20 that produces the corresponding movement of main control element 22 or 24, as arrow 32 in FIGS. 3a and 3b makes clear. The engagement of gears or gear ratio steps therefore always occurs with the rotational angle or direction of movement 32 of the actuation or shifting shaft 20, and the "return movement" of the main control elements into their neutral position always occurs with rotational angle or rotational direction 34. However, this may also be reversed. However, the same direction of movement or the same rotational angle is always provided for the engagement, regardless of which main control element is to be used to act on the final control mechanism in order to engage a gear ratio step. The design shown in FIGS. 3a and 3b may also be characterized as "active interlock" rail operation, and in particular for swivel angle or swivel direction 32.

In the design according to FIGS. 3a and 3b, positions are shown in particular for the two shift directions of shift rail 14a, the shift direction change being achieved via switching the particular main control element 22 or 24. In so doing, a specific shift direction or a specific shift direction of the shift rail 14 in question is assigned to each of the individual main control elements.

In contrast to the design known from German Patent application 102 06 561 A1 or the design that is described as the internal state of the art in the introduction, the actuation according to the exemplary embodiment only shifts with half of the rotational angle for shifting. In this way the shifting drive unit, such as an electric motor, may be shortened to half of the shift travel. This may be advantageous under certain design space conditions. However, in the design according to this exemplary embodiment, the select travel is approximately twice as large as for the design according to German Patent Application 102 06 561 A1 or the design according to the state of the art addressed above.

A principal advantage of the design shown in the exemplary embodiment is that, for the case of a reference "black out" the neutral gate may be located in any case, because this position is assigned to a specific rotational angle or rotational direction. Therefore, in no case is it possible to engage a gear by mistake. However, what is noteworthy here is that the design shown in the exemplary embodiment may be driven in an especially preferred design, using an electronic control device for engaging and disengaging gears. However, it is also possible to provide such a design for a manual shift transmission or a transmission without electronic control. Nevertheless, it is especially preferably provided that such an electronic controller is provided that may be used to effect referencing procedures of the proposed type. In this context, it is also possible to provide a limit stop device.

As FIGS. 2, 3a and 3b in particular show, it is provided in this exemplary embodiment that secondary control elements 26, 26a, 28, 28a, when viewed in the axial direction of control shaft 20, are wider than main control elements 22, 24. These elements are therefore disposed relative to each other in such a way that it is ensured that a corresponding secondary control element 26, 26a may act on same shift rail 14c to lock and/or disengage gear ratio steps that can be engaged or disengaged via this shift rail if—in a first position of the actuation shaft—first main control element 22 is positioned in such a manner that it is possible to use the second main control element 24 to engage a gear ratio step via this shift rail 14a (FIG. 3b). It may also be provided that instead of one of secondary control elements 26, 26a, two axially spaced secondary control elements are provided that effect the aforementioned operation. This may be provided in particular if the main control elements 22, 24 have a greater distance from each other in the axial direction than is shown in FIGS. 3a and 3b.

In the positions shown in FIGS. 3a and 3b, no secondary control element is able to act on shift rails 14b and 14d. This has the background that the "active interlock" design or device or "active interlock" rail actuation shown there depicts an exemplary embodiment for a transmission device having two partial drive trains. In this context shift rails 14a and 14c are assigned to a first partial transmission and shift rails 14b and 14d are assigned to a second partial transmission. Both the main control elements as well as the secondary control elements are able to operate in both partial transmissions in the design according to FIGS. 1 to 3b.

Figure 6:
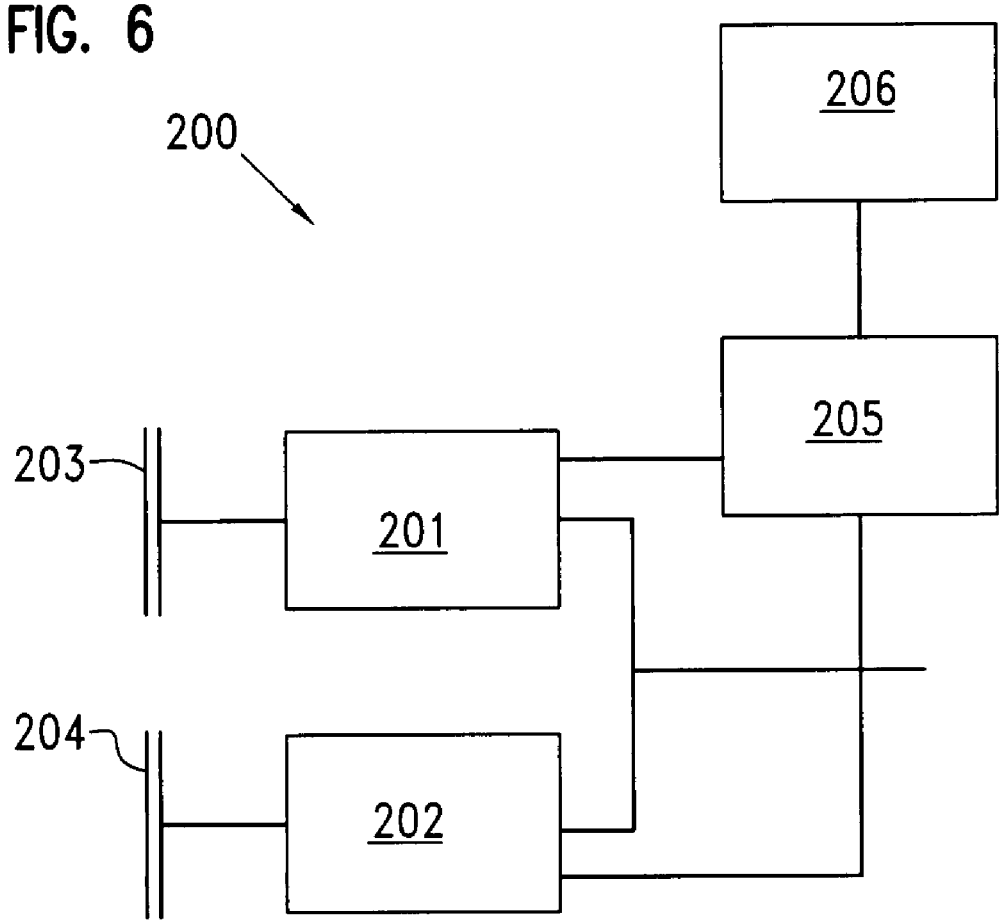
FIG. 6 shows a block diagram of a transmission with two partial transmissions and two clutches.

FIG. 6 is a block diagram of transmission 200 comprising partial transmissions 201 and 202. Partial transmission 201 has clutch 203 for transmitting torque and partial transmission 202 has clutch 204 for transmitting torque. The partial transmissions are controlled by actuator 205. Actuator 205 is in turn controlled by a control unit 206, which may be an electric motor.

Figure 4:
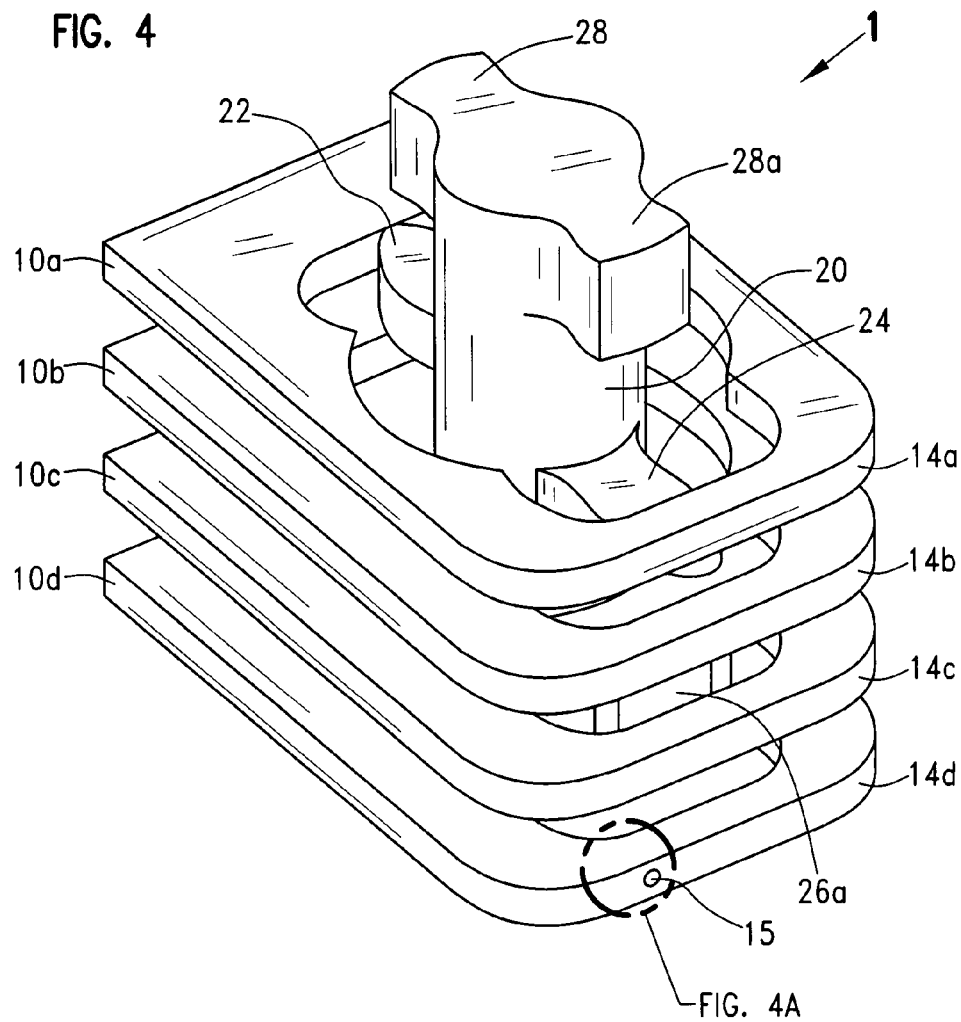
FIG. 4 shows a partial view of a transmission device according to FIG. 1 and/or 2 and/or according to FIG. 3a or 3b.
Figure 4A:
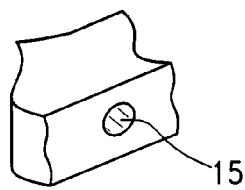
FIG. 4a shows a detail view of the coupling sleeve in FIG. 4.
Figure 5A:
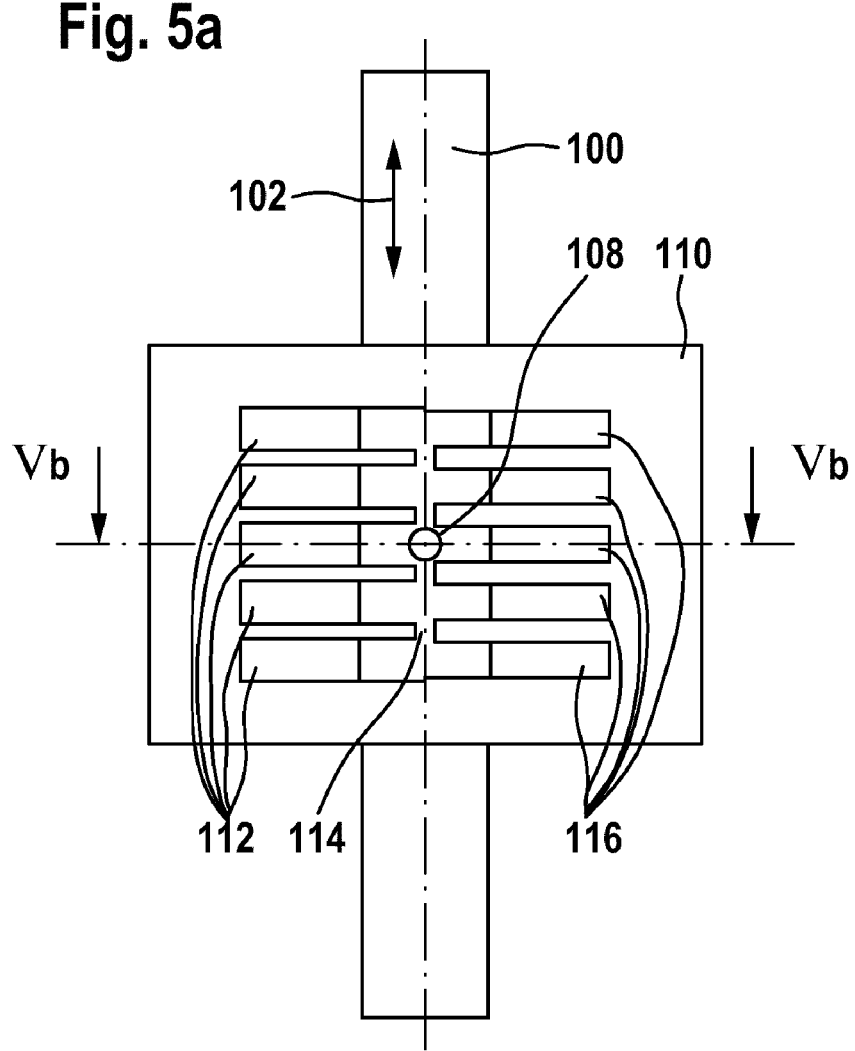
FIG. 5a shows a design of a gate, previously known to the applicant, for an actuation device having a central shaft.
Figure 5B:
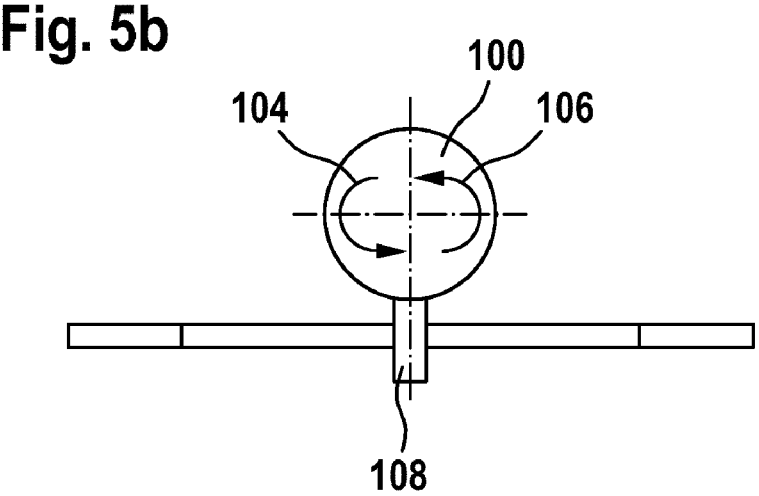

FIG. 4 shows a three-dimensional view of the design according to FIGS. 3a and 3b.

In the design according to the invention—especially as shown in the figures—a secure neutral reference may be located for the transmission actuator, which for the case of a reference "black out" is located again in any case by the control without having to carry out shift operations in the transmission. A reference "black out" means in particular that a reference value or the reference values are lost.

It should be noted that the design according to the invention is or has in particular an "active interlock".

In the design according to FIGS. 1 to 4—starting from the known embodiment according to German Patent Application 102 06 561 A1 or from the active interlock shift rail design having main and secondary control elements that is known to the applicant—an "active interlock" actuation is proposed that operates only the turning or actuation shaft for shifting the gears only in a rotational direction.

This design may in particular also be characterized as "active interlock" rail actuation with single rotational direction for the turning shaft for reaching the neutral reference or as shift rail actuation with single shift direction for reaching the neutral reference.

LIST OF REFERENCE CHARACTERS

1 Transmission device
10 Final control mechanism
10a Final control mechanism
10b Final control mechanism
10c Final control mechanism
10d Final control mechanism
12 Actuation device
14 Shift rail
14a Shift rail
14b Shift rail
14c Shift rail
14d Shift rail
15 Coupling sleeve
16 Projection
18 Shift mouthpiece
20 Control shaft
22 First main control element
24 Second main control element
26 Secondary control element
26a Secondary control element
28 Secondary control element
28a Secondary control element
30 Double arrow
30a Arrow (direction of movement of 14)
30b Arrow (direction of movement of 14)
32 Arrow (drive direction of 20 for engagement)
34 Arrow (drive direction of 20 for return movement)
36 Functional edge of 18
38 Functional edge of 18
40 Idle gate
100 Central shifting shaft, actuation shaft, turning shaft
102 Double arrow (select direction)
104 Arrow (shift direction)
106 Arrow (shift direction)
108 Pin
110 Plate
112 Section in 110
114 Section in 110
116 Section in 110
200 Transmission
201 Partial Transmission
202 Partial Transmission
203 Clutch
204 Clutch
205 Actuator
206 Control unit

What is claimed is:

1. A transmission device for a motor vehicle having a plurality of gear sets that form gear ratio steps, final control mechanisms (10 or 10a, 10b, 10c, 10d) being provided, and, for actuating the final control mechanisms (10), an actuation device (12) being provided that has a plurality of drivable main control elements (22, 24) for acting on final control mechanisms for the engagement of gear ratio steps, wherein it is possible to act on at least one final control mechanism (10) via either a first main control element (22) or a second main control element (24), the final control mechanism (10) being moved as a function of the main control element (22, 24) that acts on the final control mechanism (10) in one of two different directions, wherein the two different directions are opposite directions, when the plurality of drivable main control elements (22,24) are in an identical drive direction.

2. The transmission device of claim 1, further comprising a plurality of gear sets that form gear ratio steps, the final control mechanisms (10) being provided, and, for actuating the final control mechanisms, an actuation device (12) being provided that has one or more, drivable main control elements (22, 24) for acting on final control mechanisms (10) for the engagement of gear ratio steps, main control element neutral positions being assigned to any one of the main control elements (22, 24) in which the main control element (22, 24) is movable for the selection of a final control mechanism (10) to be acted on for the engagement of a gear ratio step, wherein at least one limit stop device is provided for the main control element(s) (22, 24) of the actuation device (12) that is positioned in such a way that the main control element (22, 24) that runs up against this limit stop device is positioned in a main control element neutral position, the final control mechanism (10) that is to be acted upon via the main control element (22, 24) to engage a gear ratio step being selectable via a movement of the main control element along this limit stop.

3. The transmission device as described in claim 1, wherein the actuation device (12) has an actuation shaft (20) and the first main control element (22) and the second main control element (24) operate on or in different planes and are disposed at an angle, with respect to each other.

4. The transmission device as described in claim 1, wherein the control device (12) has at least one secondary control element (26, 26a, 28, 28a) for acting on the final control mechanisms (10) to disengage gear ratio steps and/or to lock gear ratio steps.

5. The transmission device of claim 1, having a plurality of gear sets forming gear ratio steps, final control mechanisms (10) being provided, each of which has a connecting element such as a shift rail (14) or a shift fork and an actuation device (12) being provided to actuate the final control mechanisms (10) that has an axially displaceable and rotational or swiveling actuation shaft (20) and which has two main control elements (22, 24) for the actuation of the final control mechanisms (10) as well as at least one secondary control element (26, 26a, 28, 28a) for acting on the final control mechanisms (10) to disengage gear ratio steps and/or to lock gear ratio steps, wherein the two main control elements (22, 24) are offset in relation to each other in the circumferential direction, extend from the actuation shaft (20) and operate in planes that are oriented transverse to the axial direction of the actuation shaft (20) or are mounted on the actuation shaft (20), wherein either one of the main control elements (22, 24) act on a final control mechanism (10) or a selected final control mechanism (10) to engage a gear ratio step, and a movement of the connecting element (14) of the final control mechanism (10) in a first direction being effected when there is the same rotational direction of the actuation shaft (20) on the first main control element (22), and movement of the connecting element (14) of the final control mechanism (10) in a second direction, opposite the first, being effected during the action of the second main control element (24).

6. The transmission device as described in claim 1, wherein each of the final control mechanisms (10) has at least one shift mouthpiece (18), wherein the at least one shift mouthpiece (18) acts on the main control element (22, 24) or secondary control elements (26, 26a, 28, 28a) to actuate them via the shift mouthpieces.

7. The transmission device as described in claim 6, wherein each of the shift mouthpieces has a functional edge.

8. The transmission device as described in claim 1, wherein the main control element(s) (22, 24) is/are movable in such a manner that the main control element (22, 24) in its movement does not act on one of the final control mechanisms (10) such that it also is moved, and the main control element(s) (22, 24) are moveable in such a manner that the main control element (22, 24) in its movement acts on one of the final control mechanisms in such a manner that it is also moved.

9. The transmission device as described in claim 1, wherein connecting elements (14) of different final control mechanisms (10) that are aligned parallel to each other form idle gates, the one main control element (22 or 24), in an actuation of a final control mechanism (10) is positioned in the plane of such an idle gate or is swiveled into such an idle gate via the other (24 or 22) of the two main control elements (22, 24).

10. The transmission device as described in claim 1, wherein the main control element (22, 24) and the secondary control element(s) (26, 26*a*, 28, 28*a*) cooperate in such a manner that during a movement of the main control element (22, 24) in the shift direction, by which the main control element (22, 24) upon continued movement acts on the final control mechanism (10) in such a way that, via the final control mechanism (10) a gear ratio step is engaged, the secondary control element(s) (26, 26*a*, 28, 28*a*) act(s) on at least one other final control mechanism (10), on the remaining final control mechanisms (10) of the transmission device (1) or of the same partial transmission of the transmission device (1), in such a manner that it is ensured that all gear ratio steps of the transmission or of the partial transmission are disengaged before the target gear ratio step is engaged by the final control mechanism (10) and the main control element (22 or 24) upon continued movement and/or before a synchronization is triggered.

11. The transmission device as described in claim 1, wherein the gear sets that form the gear ratio steps each have gear wheels carried by different shafts, of which one is rotationally mounted on its supporting shaft and may be connected in a rotationally fixed way to a final control element, such as a coupling sleeve, for the engagement of the gear ratio step in question via the final control element, the final control mechanisms each having such a final control element.

12. The transmission device as described in claim 1, wherein the transmission device (1) has two or more partial transmissions, separate main (22, 24) and/or secondary control elements (26, 26*a*, 28, 28*a*) being provided for the partial transmissions.

13. The transmission device as described in claim 1, wherein an electronic controller is provided for driving the actuation device.

14. An actuation device for the actuation of final control mechanisms (10) of a transmission device (1) designed according to claim 1, the actuation device (12) having at least two main control elements (22, 24) and at least one secondary control element (26, 26*a*, 28, 28*a*).

15. A method for the electronically controlled determination of reference positions of an actuation device (12) of a transmission device (1), an actuation device (12) being provided at least one drive device on the input side, such as an electric motor, that is electronically driven, and the actuation device (12) having at least one main control element (22, 24) for acting on final control mechanisms (10) of the transmission device (1), the at least one main control element (22, 24) being movable in a first direction or shift direction, and this the at least one main control element (22, 24), in a prescribed position range, the neutral or select gate, of the first direction or shift direction being displaceable in a select direction that is oriented transverse to the first direction or shift direction, movement changes of the at least one main control element (22, 24) being determined via an incremental travel sensor, wherein the drive device for determining at least one reference position situated in the neutral gate, especially a reference position of the incremental sensor in the first direction or shift direction, is driven in a memorized drive direction and acts on the at least one main control element (22, 24) so as to drive it, the reference position or neutral gate being reached for this drive direction of the drive device if the at least one main control element (22, 24) has reached a limit stop situated in the shift direction.

\* \* \* \* \*

UNITED STATES PATENT AND TRADEMARK OFFICE
CERTIFICATE OF CORRECTION

PATENT NO. : 7,313,979 B2 Page 1 of 1
APPLICATION NO. : 11/160726
DATED : January 1, 2008
INVENTOR(S) : Ehrlich et al.

It is certified that error appears in the above-identified patent and that said Letters Patent is hereby corrected as shown below:

Column 18, line 23 should read

-- direction, and the at least one main control element (22, --.

Signed and Sealed this

Eleventh Day of November, 2008

JON W. DUDAS
*Director of the United States Patent and Trademark Office*